Aug. 10, 1954   W. C. DAVIDON   2,686,008
COUNTING AND SCALING CIRCUITS
Filed Dec. 30, 1949   4 Sheets-Sheet 1
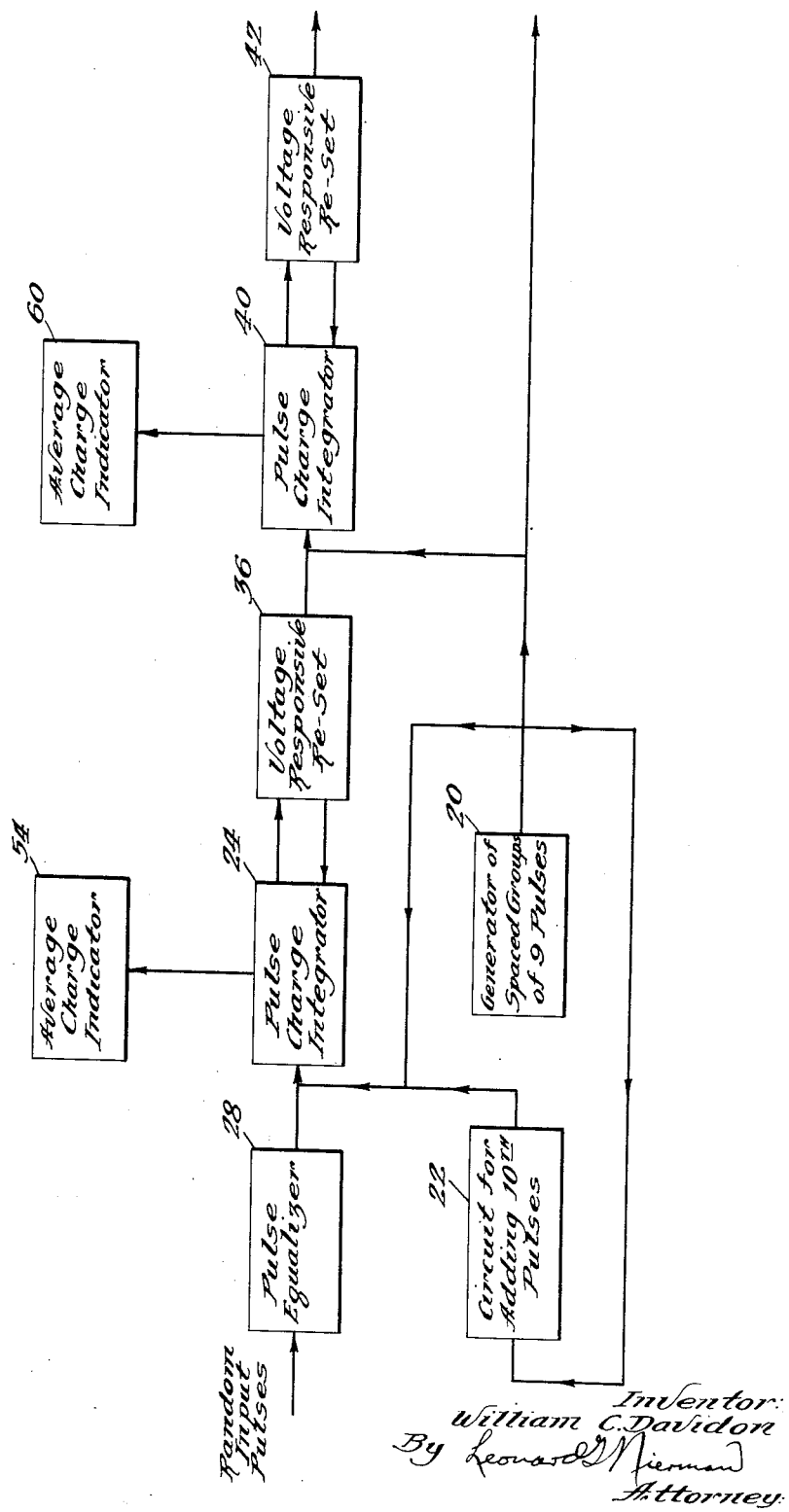
Inventor:
William C. Davidon
By Leonard J. Nieman
Attorney Aug. 10, 1954   W. C. DAVIDON   2,686,008
COUNTING AND SCALING CIRCUITS
Filed Dec. 30, 1949
4 Sheets-Sheet 2
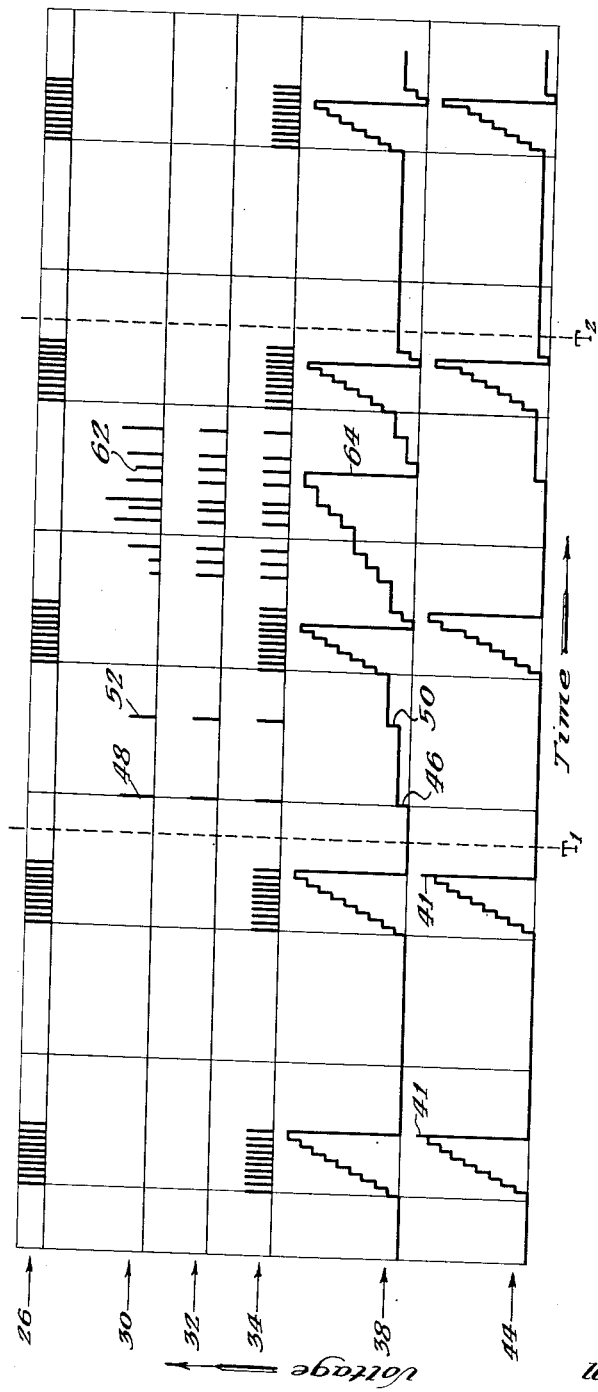
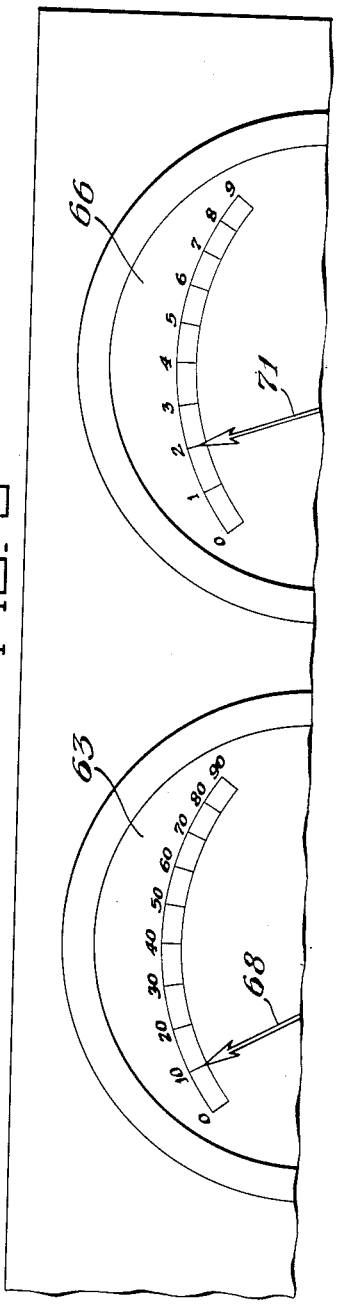
Inventor:
William C. Davidon
By: Leonard G. Nierman
Attorney Aug. 10, 1954     W. C. DAVIDON     2,686,008
COUNTING AND SCALING CIRCUITS Filed Dec. 30, 1949                       4 Sheets-Sheet 3

Inventor:
William C. Davidon
By: Leonard H. Nirman
Attorney

Patented Aug. 10, 1954

2,686,008

UNITED STATES PATENT OFFICE 2,686,008

COUNTING AND SCALING CIRCUITS

William Cooper Davidon, Chicago Heights, Ill., assignor to Nuclear Instrument and Chemical Corporation, a corporation of Illinois Application December 30, 1949, Serial No. 136,014

24 Claims. (Cl. 235—92)

This invention relates to an improvement in counting and scaling devices. More specifically the invention relates to electronic counting and scaling circuits for counting randomly occurring voltage pulses as, for example, the pulses produced by a radioactivity measuring instrument such as a Geiger-Müller tube or proportional counter.

Voltage pulses which occur at a rate so high as to make direct mechanical recording impractical are commonly counted by causing each pulse to change the state of static equilibrium of an electronic counting circuit. The counting circuits heretofore employed have a plurality of static equilibrium states and are adapted to be transferred from one static equilibrium state to another static equilibrium state upon the occurrence of each input pulse. Thus the state of static equilibrium in which the circuit is found after the occurrence of the input pulses to be counted constitutes a measure or count of the number of pulses having so occurred. However, since the number of such equilibrium static states which may be obtained is very limited, it is common to "scale" the incoming pulses by cascaded scaler stages. In a scaler stage, the equilibrium states are cyclic; if the scaler has $n$ equilibrium states, it is so designed that on the $n$th pulse it returns to its original or quiescent equilibrium state, at the same time producing a pulse which is transmitted to the next scaler stage, which (in the case of scaler stages having the same scaling factor) accordingly produces an output pulse for each $n^2$ input pulses. The scaling factor for $x$ such identical stages is accordingly $n^x$. The output pulses from the last scaler stage are commonly recorded on a mechanical register.

Many circuits suitable for scaling are now well known. The most common scaling circuits are the scaler of two, or binary scaler, and the scaler of ten, or decade scaler. The latter has the advantage of being capable of being read directly in the decimal system, whereas the former requires a calculation or chart to convert the indications of the various stages to the decimal number system. However, in general, the decade scalers heretofore employed have either been relatively complex, requiring a large number of tubes and other components, or have not been sufficiently stable and reliable for accurate counting. It has been found in accordance with the present invention that the essence of the difficulty of obtaining a satisfactorily accurate but nevertheless simple scaler stage having a high scaling factor, such as ten, is that all of the circuits heretofore devised for this purpose employ static, as opposed to dynamic, states of equilibrium. In the scaling circuits now in use, the circuit is transferred by the incoming pulse from one state of static equilibrium to the next succeeding state of static equilibrium.

The present invention lies in the provision of a novel type of scaler circuit in which the states of equilibrium which constitute a measurement of the number of input pulses occurring are states of dynamic equilibrium rather than of static equilibrium. In the present invention, the input pulses being counted are caused to alter one or more characteristics of a periodically fluctuating voltage, rather than merely transferring the circuit from one static equilibrium state to another. There are provided means to generate a direct voltage responsive to the condition of the characteristic of the fluctuating voltage, and means to produce an indication of the direct voltage.

According to the present invention, a periodic voltage signal generated for the purpose is altered as to phase, frequency, amplitude, waveform, average value, R. M. S. value or some other steady-state characteristic, or some combination of these, by each input pulse. In the present system each input pulse up to a predetermined number alters such characteristic or characteristics of the periodic voltage, and the last input pulse of the predetermined number returns the characteristic to its original condition. Each such return of the periodic voltage to its original condition in turn causes a change either in another characteristic of the same periodic voltage or in the same or another characteristic of another periodic voltage. Thus the states of the characteristics of the periodic voltages so successively altered constitute a measure of the total number of input pulses having occurred in much the same manner as the states of static equilibrium in the successive scaler stages heretofore employed. However, by employing a dynamic system, the number of tubes and other components required to give any desired scaling factor is greatly reduced. In addition, in the dynamic scaling system of the present invention, the various periodic voltages continue to appear in the system even when no input pulses are being fed into the system. Thus the dynamic scaling system of the present invention offers a further advantage over the static systems heretofore known, in that in the present system most defects which may develop, such as defective tubes or other components, will immediately produce obvious effects indicating the existence of a defect when the circuit is in the "zero" condition wherein all of the various characteristics of the periodic voltage or voltages are in their original condition. In a static system, on the other hand, the probability is relatively high that defects in the system will not affect the indication of the scaler until pulses to be counted are impressed at the input. Thus, in addition to the advantage of simplification as regards number of components, a scaler employing dynamic states of equilibrium in accordance with the present invention requires far less checking and calibration to verify that it is in proper condition for accurate operation than do the scaler circuits heretofore employed. A further advantage of the dynamic system which is the subject of the present invention over the static systems heretofore employed is that the static systems, when operated with no input pulses or with infrequent input pulses, are prone to produce differential aging of the components, which is avoided by the device of the present invention. In addition the employment of dynamic, rather than static, states of equilibrium facilitates the use of counting and scaling systems as components of other devices, notably in electronic computing and calculating machines. The provision of means to generate direct voltages responsive to the dynamic states of equilibrium permits the use of simple and well-known direct-voltage-responsive devices for visual or other indication of the number of pulses received.

There is above set forth the general basic teaching of the invention. Persons skilled in the art, upon study of the above general description, will readily devise a large number of circuits embodying this basic teaching. However, in accordance with the requirements of the patent laws, there is described below, and illustrated in the drawing, a single embodiment of the invention to facilitate the understanding thereof. The embodiment of the invention illustrated in the drawing constitutes a simple, yet stable and reliable, scaling circuit employing the principle of alteration of the characteristics of periodic voltages described above.

In the drawing:

Figure 1 is a schematic block diagram of the embodiment of the invention selected for purposes of illustration;

Figure 2 is a simplified graphical representation of a sample of the operation of the system of Figure 1 illustrating wave forms in various portions of the system as a function of time;

Figure 4A:
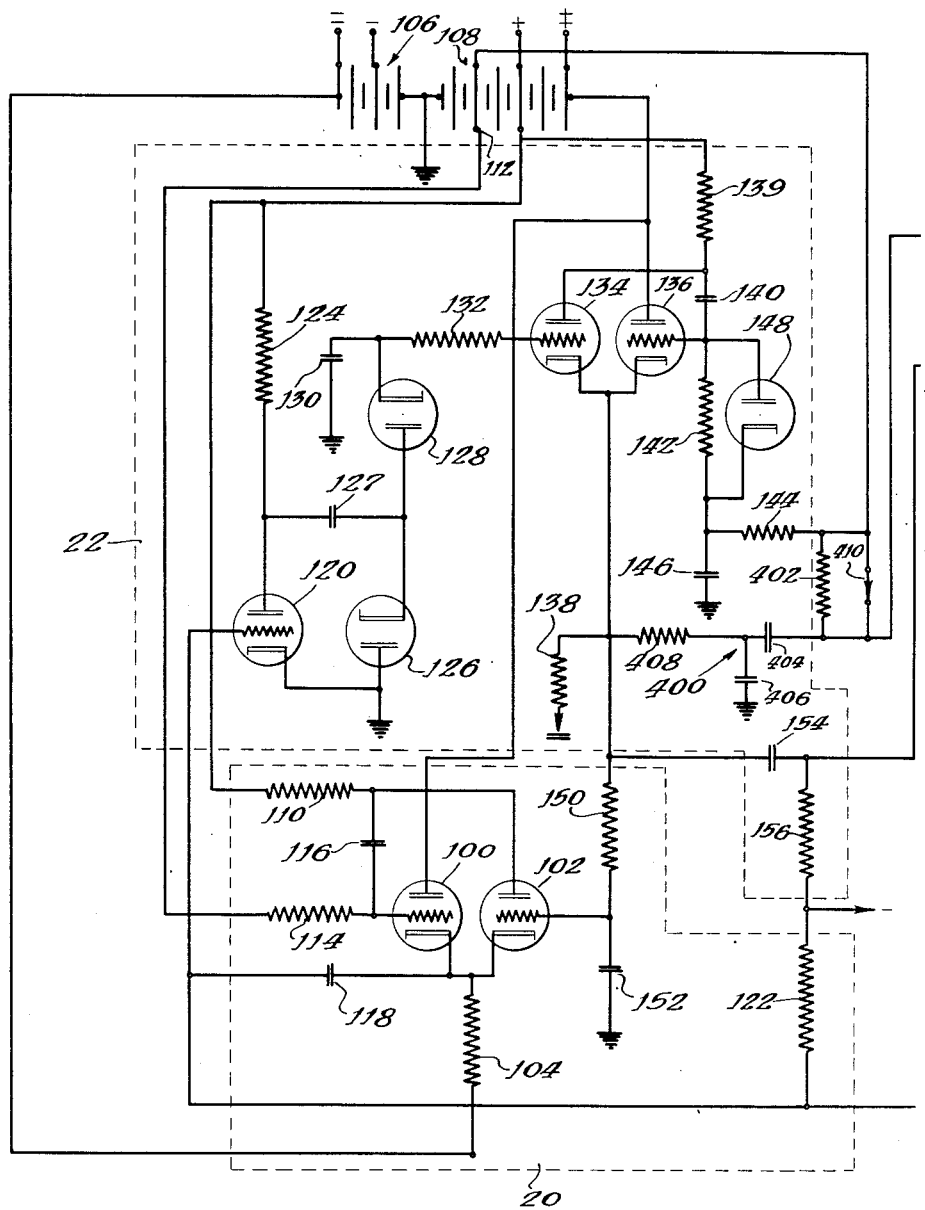
Figure 4B:
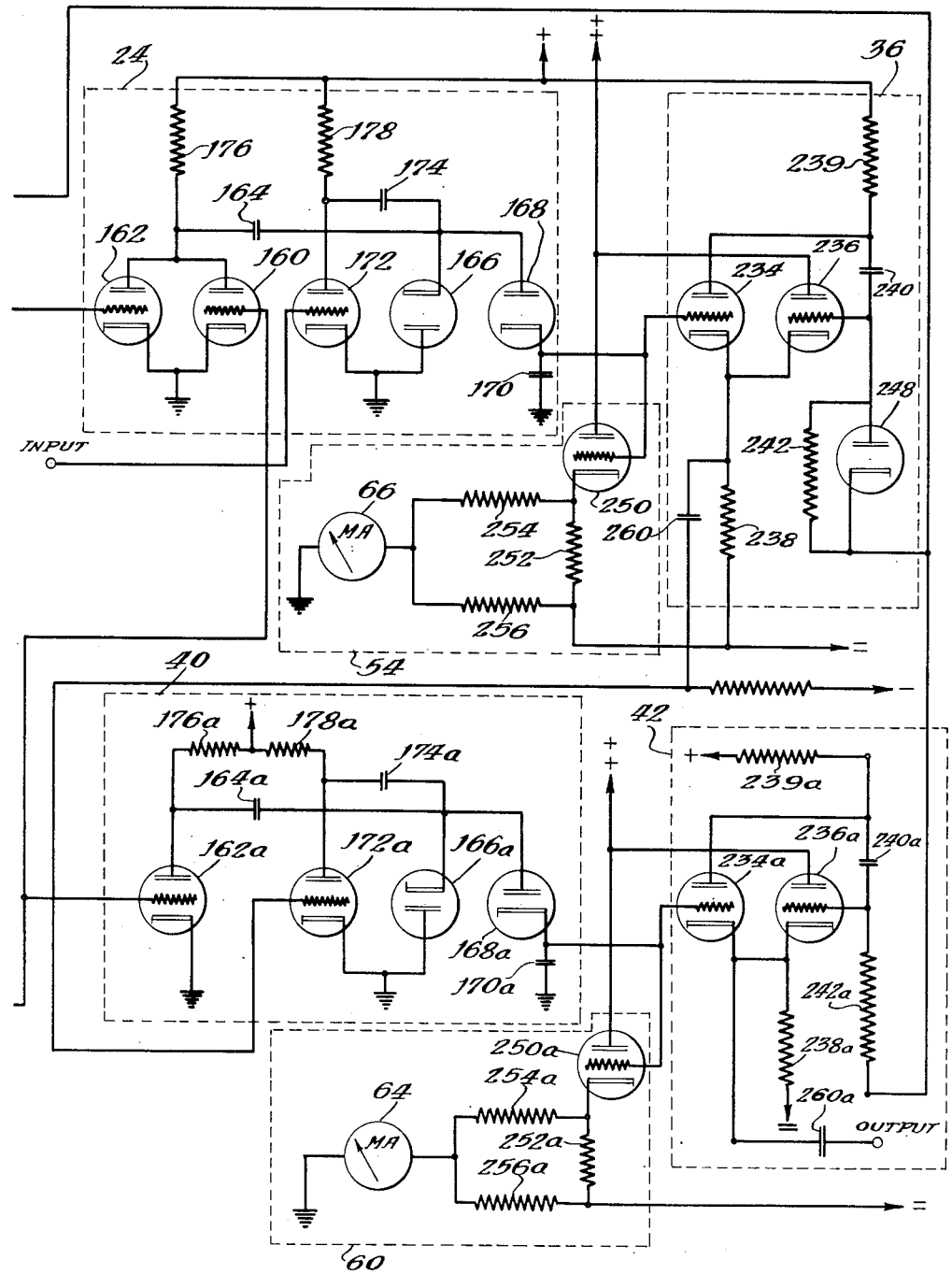

Figure 3 is a fragmentary more or less schematic representation of a panel meter assembly illustrating the manner in which indicator devices shown symbolically in Figure 1 may indicate the total number of input pulses having occurred in the sample operation of Figure 2; and Figure 4, consisting of two sheets designated Figures 4a and 4b, respectively, is an electrical diagram illustrating a particular combination of circuit components and connections forming the system of Figure 1.

In the particular embodiment of the invention illustrated in the drawing and described herein, a periodic voltage generated for the purpose is altered in response to the incoming pulses as regards phase, average value, and wave-form. Since the average value is the characteristic which is most easily measured, the variation of this characteristic is employed to indicate the count of the incoming pulses.

Referring now to Figure 1, it will be seen that the output of a generator of spaced groups of nine pulses, designated 20 in the drawing, is fed to the input of a circuit 22 for adding a tenth pulse to each of the groups so generated. The outputs of the generator 20 and the circuit 22 are fed to the input of a circuit 24 which integrates or adds the charges from all pulses impressed in the input thereto. The wave-form of the pulses impressed on the integrator 24 by the generator 20 and the circuit 22 is shown schematically at 26 in Figure 2. The random input pulses to be counted are introduced into the system through a pulse equalizer 28 which serves to shape all of the input pulses to a form and amplitude, and thus to a charge, identical with the pulses generated as described. In Figure 2 of the drawing, the wave-form of the random input pulses to the pulse equalizer 28 is shown generally at 30 and the equalized output pulses from the pulse equalizer are shown at 32. The equalized input pulses to be counted are fed to the charge integrator 24 along with the pulses from the generator 20 and the circuit 22, as indicated at 34 in Figure 2.

The voltage occurring across the pulse charge integrator 24 by reason of the integration of the charge of the incoming pulses is fed to a voltage responsive re-set 36 which discharges the integrator 24 to its original state of charge (in this case complete discharge) each time that it receives a charge equal to ten pulses occurring at its input, either from the pulse equalizer 28 or from the generator 20 and circuit 22. In the simplified illustration of Figure 2, the pulses to be counted are inserted between the time $T_1$ and the time $T_2$. Prior to the time $T_1$, the wave-form of the voltage across the integrator 24, shown at 38, consists of nine upward steps, one occurring at each of the nine pulses from the generator 20, a return to the condition of zero voltage brought about by the re-set 36 in response to the occurrence of the tenth pulse, and a long gap, at the end of which the cycle is recommenced. It should be understood that for purposes of simplicity of illustration, the duration of the groups of pulses is illustrated in the drawing as being of the same order of magnitude as the gap between the groups of pulses. However, in actual practice the gap between the groups of pulses is preferably greater than the duration of each group of pulses by a factor of at least a hundred.

The output of the generator of spaced groups of nine pulses 20 is additionally fed to a further pulse charge integrator 40 whose output is coupled to, and which is re-set by, a voltage responsive re-set 42 in a manner similar to that in which the re-set 36 discharges the integrator 24 upon the reaching of a charge corresponding to ten input pulses. The re-set 36, in addition, generates a pulse of similar character to the pulses produced by the generator 20 each time that the re-set 36 is actuated to discharge the integrator 24. This pulse, which therefore occurs on each tenth pulse fed to the integrator 24, is fed to the input of the integrator 40. Thus it will be seen that prior to the time $T_1$, when input pulses to be counted first occur, the wave-form across the integrator 40 is similar to that across the integrator 24 described above. The form of the voltage across the integrator 40 is shown in Figure 2 at 44. It will be noted that the tenth pulse, which returns the integrator 40 to the discharged condition by the action of the re-set 42 is not received from the circuit 22 which generates or adds a tenth pulse to the nine pulses from the generator 20, but is received from the action of the re-set 36 in discharging the integrator 24. In the illustrated embodiment (corresponding to the performance of a particular circuit illustrated in Figure 4 and hereinafter to be described), it is the first of each group of ten pulses which is added to the circuit 22 and transmitted to the integrator 24 but not to the integrator 40. The last pulse of each group received from the generator 20 is added to the pulse received from the re-set 36 and thus on the occurrence of this last pulse, the integrator 40 is both charged to the ninth step and discharged, as indicated by the "pips" 41.

The form and mode of generation of the periodically fluctuating voltages appearing in the pulse charge integrators 24 and 40 now being understood, the effect of random input pulses occurring at the input to the system may now be explained. As seen in Figure 2 at 46, the first step in the charging of the integrator 24 now occurs upon the occurrence of the first input pulse 48. The second step 50 occurs on the occurrence of the second input pulse 52 (assuming of course that the latter occurs before the commencement of the next group of ten pulses). When the next group or cycle of ten pulses occurs, the re-set 36 is now actuated on the eighth, rather than on the tenth, pulse, and the ninth and tenth pulses charge the integrator 24 by the first two steps.

Persons skilled in the art will at this point readily see that if no further input pulses were to now occur, the voltage across the integrator 24 would assume a new form somewhat similar to the form possessed prior to the time $T_1$. However, the discharge would now occur on each eighth, rather than each tenth, generator pulse, and the integrator would remain charged by two steps during each interval between groups of pulses. It will thus be seen that the occurrence of the two pulses has changed the periodic voltage appearing across the integrator 24 with respect to its original condition in phase, in average value, and in wave-form. It will further be seen that the magnitude of this change may readily and conveniently be measured by a device for indicating the average charge across the integrator 24, designated 54 in Figure 1.

Persons skilled in the art will note a resemblance between the action of the integrator 24 in the present system and the action of a pulse integrator which has heretofore been employed to count pulses. In one type of counting circuit now well known in the art, the input pulses are equalized and are employed to charge a condenser; the total charge on the condenser at the end of the period during which the input pulses to be counted occur constitutes a measurement of the number having so occurred. A vital difficulty which is encountered with such circuits of the prior art is that no integrator of charge (of which a condenser is the common example) is perfectly free of leakage. Thus, when it is attempted to make a measurement of the number of pulses occurring over any substantial period of time, or when it is attempted to preserve the measured indication over any substantial period of time, the measurements, and thus the results of the count, become extremely unreliable because of leakage of the integrator. In the present system, on the other hand, it will be seen that leakage of charge from the integrator 24 will produce no harmful effect on the measurement made unless the leakage is so great as to permit the loss of an amount of charge corresponding to one input pulse during the period or gap between groups of pulses generated by the generator 20. Since this time may easily be made of the order of small fractions of a second, the duration of each group of ten pulses being of the order of ten to fifty microseconds, any inexpensive condenser may be used as the integrator 24 without in any manner interfering with the accuracy of the measurement due to condenser leakage. When the input pulses to be counted are withdrawn, the integrator 24 will retain the same average charge indefinitely.

In the simplified illustration of Figure 2 there are illustrated ten additional pulses to be counted which occur subsequent to the pulses 48 and 52 whose effect upon the circuit is discussed above. Persons skilled in the art will readily see that the tenth of the entire number of pulses to be counted, designated 62, introduces an additional discharge 64 of the integrator 24, thus transmitting to the second integrator 40 an additional pulse which affects this second integrator 40 in a similar manner to that in which the first input pulse to be counted 48 affected the first integrator 24 as described above.

Thus when the pulses to be counted are terminated (the time designated $T_2$ in Figure 2) the changes in the characteristics of the fluctuating voltages across the integrators 24 and 40 as compared with the original characteristics which these fluctuating voltages possessed prior to the time $T_1$ constitute a measure of the total number of input pulses to be counted. These changes are conveniently measured by average charge indicators 54 and 60 which are coupled to the integrators 24 and 40 respectively. In Figure 3 is illustrated more or less schematically a fragment of a meter panel in which are incorporated conventional meters 63 and 66 constituting the ultimate visible portions of the indicators 60 and 54, respectively. As illustrated, the meters 63 and 66 are calibrated in tens and units, respectively, and the positions of the respective meter needles 68 and 71 indicate that the total count of pulses having occurred is twelve (corresponding to the simple conditions illustrated in Figure 2).

For purposes of facilitating understanding of the system illustrated in Figure 1, the conditions selected for illustration in Figure 2 have been made very simple. However, persons skilled in the art will readily see that the system operates in the manner described under much more complex conditions of counting. For example, extrapolation of the simple analysis of Figure 2 to the case where large numbers of pulses to be counted occur between groups of pulses from the generator 20 is obvious. Furthermore, all of the incoming pulses to be counted have been illustrated as occurring in intervals or gaps between groups of pulses from the generator 20. It will likewise be obvious that any such input pulses to be counted as should occur simultaneously with a pulse from the generator 20 or pulse adding circuit 22 would likewise be counted by charging of the integrator 24 in double steps (unless they were to occur exactly simultaneously with the discharge of the integrator 24 by the re-set 36). Additionally, although the circuit has been illustrated with only two decade stages, obviously additional stages are usually added.

Persons skilled in the art will readily apply the teachings of the invention as hereinbefore set forth. A large number of various specific circuits for the system illustrated in block form in Figure 1 will readily be devised. However, there is described below a particular circuit, illustrated in Figure 4 (consisting of Sheets 4a and 4b), which has been found particularly advantageous in practicing the embodiment of the invention illustrated in Figure 1.

In Figure 4, the portions of the circuit corresponding to the elements shown in Figure 1 are surrounded by dotted lines and designated by reference numerals corresponding to the reference numerals of Figure 1. The pulse equalizer 28 is omitted from the detailed drawing of Figure 4, since this circuit is entirely conventional and many such circuits are well known in the art.

Referring first to the generator 20 of spaced groups of nine pulses, it will be seen that a pair of triode vacuum tubes 100 and 102 are connected with a common cathode resistor 104 which is in turn connected to the high bias terminal (labelled "—" in the drawing) of a bias voltage supply 106, the positive terminal of which is grounded. The plate of the triode 102 is connected to the positive terminal (designated "+" in the drawing) of a plate voltage supply 108 through a plate load resistor 110. The grid of the tube 100 is connected to a low positive terminal 112 of the supply 108 through a grid resistor 114. The plate of the triode 102 is coupled to the grid of the triode 100 by a coupling condenser 116. The plate of the triode 100 is connected directly to a high positive terminal (designated "++" in the drawing) of the supply 108. Persons skilled in the art will recognize that the components of the pulse generator 20 thus far described constitute one form of free-running multivibrator which ordinarily generates a signal consisting of periodically spaced identical rectangular pulses when the grid of the triode 102 is held at a fixed potential. However, as will be shown below, the action of the multivibrator in the present circuit is modified by the connections of the grid of the triode 102 in such a manner that the multivibrator 20 is shut off after each ninth pulse for a period which is long compared to the duration of such nine pulses.

The output of the multivibrator pulse generator 20, taken at the cathodes of the triodes 100 and 102, is fed through a coupling condenser 118 to the grid of a triode 120, which constitutes the input tube of the circuit 22 for adding a tenth pulse in the manner hereafter to be described. The grid of the triode 120 is connected to the low bias terminal (designated "—" in the drawing) of the bias supply 106 (which is sufficient to cut off current in the tube) through a grid resistor 122, which also constitutes the output resistor of the generator 20. The cathode of the triode 120 is connected to ground (the common positive and negative terminal of the supplies 106 and 108 respectively). The values of the resistance 122 and the condenser 118 are sufficiently low so that the negative pulses appearing at the cathodes of triodes 100 and 102 produce both negative and positive pulses across the resistor 122. The plate of the triode 120 is connected to the positive ("+") terminal of the plate supply 108 through a plate load resistor 124. The tube 120 thus constitutes a pulse amplifier for the positive pulses from the generator 20.

The output of the amplifier tube 120 is coupled to the cathode of a diode 126, the plate of which is grounded, by a coupling condenser 127. The cathode of the diode 126 is also connected to the plate of a second diode 128. A condenser 130 is connected between the cathode of the diode 128 and ground. The series-shunt diode circuit and the condenser 130 thus constitute a circuit for integrating the pulses which are fed to the circuit by the amplifier tube 120. The coupling condenser 127 is discharged after each pulse through the diode 126. Thus it will be seen that pulses from the generator 20 will successively charge the condenser 130. This condenser is connected through a series grid protective resistor 132 to the grid of a triode 134.

The cathode of the triode 134 is connected to the cathode of a triode 136, both cathodes being connected to the high bias terminal of the supply 106 through a common cathode resistor 138. The plate of the triode 136 is connected to the high positive terminal of the supply 108 and the plate of the triode 134 is connected to the low plate supply terminal of the supply 108 through a plate load resistor 139. The plate of the triode 134 is coupled to the grid of the triode 136 by a coupling condenser 140. The grid resistor 142 of the triode 136 is connected to the low positive voltage terminal 112 through a resistance-capacity filter consisting of a resistance 144 and a condenser 146. It will be seen that the circuit connections of triodes 134 and 136 are quite similar to those of triodes 102 and 100 respectively. However, the circuit values are so chosen that the circuit of triodes 134 and 136 constitutes a one-shot multivibrator which triggers to produce a single pulse each time the condenser 130 becomes charged to a critical voltage, the condenser 130 being discharged during such pulse by current between grid and cathode of triode 134, the cathode falling below ground potential during such pulse. The critical potential of the grid of triode 134 at which this one-shot multivibrator triggers corresponds to the potential to which the condenser 130 is charged by nine pulses from the generator 20. Thus on the charging of the condenser 130 by nine pulses, the one-shot multivibrator is triggered, and the common cathode connection goes to a potential highly negative with respect to that previously possessed by it. This fall of potential is coupled to the grid of triode 102 in the generator 20 by the resistor 150, the condenser 152 being connected from the grid of the triode 102 to ground. The time constant of the one-shot multivibrator (triodes 134 and 136) is made very long, so that the pulses of the one-shot multivibrator are of much greater duration than the time occupied by nine pulses from the free-running multivibrator (triodes 100 and 102).

The negative potential thus impressed on the grid of the triode 102, for a period which is very long compared to the period occupied by the generation of the nine pulses, quenches the generator 20 for this long period. The generator 20 thus is caused to produce groups of nine pulses separated by a time gap which is very long compared to the duration of each group of pulses. On the output of the circuit 22, connected to the common cathode connection of the triodes 134 and 136, is a differentiating circuit consisting of a series condenser 154 and a shunt resistor 156.

Thus the output of the generator 20, appearing across the resistor 122, consists of groups of nine positive and negative pulses separated by a relatively long gap. The output of the pulse adding circuit 22, appearing across the resistor 156, consists of a negative pulse which appears almost immediately after the ninth pulse from the generator 20, and a positive pulse which appears after a long gap and just prior to the first of the nine pulses from the generator 20.

The output of the generator 20 is fed to the grid of one input tube 160 of the integrating circuit 24. The output of the pulse adding circuit 22 is fed to a second input tube 162 of the integrating circuit 24. The anodes and cathodes of the tubes 160 and 162 are connected in parallel, and the outputs of these tubes are coupled through a condenser 164 to a shunt-series diode circuit consisting of a shunt diode 166 and a series diode 168, an integrating condenser 170 being connected from the cathode of the diode 168 to ground. The input pulses to be counted are fed to the grid of a third input tube 172, which is coupled to the shunt-series diodes by a coupling condenser 174. The triodes 160 and 162 have a common plate load resistor 176, and the triode 172 has a plate load resistor 178, both of these resistors being connected to the low plate voltage terminal of the power supply 108.

The tubes 160, 162 and 172 are normally cut off. It will therefore be seen that there will be collected on the condenser 170 a positive charge for each positive pulse from pulse generator 20, and from pulse adding circuit 22, and for each positive input pulse to be counted.

The circuit of the voltage responsive reset 36, across the input of which the condenser 170 is connected, is very similar to that of the one-shot multivibrator of the pulse adding circuit 22. Accordingly, the elements of the voltage responsive reset 36 corresponding to elements of the pulse adding circuit 22 have been designated in the drawing by corresponding numerals, elements 234, 236, 238, 239, 240, 242, and 248, corresponding in function to elements 134, 136, etc. The values of the circuit constants in the voltage responsive reset 36 are so chosen that the pulse produced by the one-shot multivibrator comprising tubes 234 and 236 is very short, unlike the pulse produced by the one-shot multivibrator comprising tubes 134 and 136. The voltage responsive reset circuit 36 triggers upon the charging of the condenser 170 by 10 input pulses. Thus the condenser 170 is discharged each time it receives 10 input pulses in the manner described above in connection with the block diagram of Figure 1.

The average charge indicator 54 consists of a vacuum tube volt-meter connected across the condenser 170. The voltmeter is of the cathode follower type employing a triode tube 250, and a cathode resistor 252. Resistors 254 and 256 form a bridge across the cathode resistor 252 to "zero" the current in the visible meter indicator 66 in the absence of pulses to be counted (or when the total number of pulses counted is an even multiple of 10). The output pulse from the reset circuit 36 is coupled to the input of the second integrator 40 by a coupling condenser 260.

The structure and operation of the second pulse charge integrator 40, the second voltage responsive reset 42, and the second average charge indicator 60 are so closely identical with the structure and operation of the pulse charge integrator 24, the voltage responsive reset 36, and the average charge indicator 54, that no further explanation need herein be set forth, and the elements of these circuits have accordingly been designated with the same reference characters as the elements of the circuits already described, with the addition of the letter "a."

The manner in which the circuit illustrated in Figure 4 produces the wave forms illustrated in the simplified diagrams of Figure 2 will by now be apparent to persons skilled in the art. There remains to be described only the manner in which the device is reset to zero in order to commence a subsequent counting operation. This resetting is accomplished by providing an auxiliary output circuit from the pulse adding circuit 22. The auxiliary output circuit, generally designated by the numeral 400, consists of an output resistor 402 and a de-coupling network consisting of condensers 404 and 406 and a resistor 408. The resistor 402 is normally short circuited by a switch 410. When it is desired to reset or zero the circuit, the switch 410, which may be a normally closed push-button switch, is opened, and the negative pulses which occur at the cathodes of the tubes 134 and 136 are impressed on the grids of the tubes 236 and 236a. These negative pulses trigger the voltage resets 36 and 42, and when the switch 410 is again closed to prevent further transmission of pulses to the tubes 236 and 236a from the pulse adding circuit 22, all of the voltage forms are restored to their original condition, and remain in that condition until pulses to be counted are again fed to the input tube 172.

Persons skilled in the art will readily select many sets of particular circuit values for the circuit illustrated in Figure 4. However, in order to aid in the practice of the invention, there is given below a particular set of circuit values which have been found satisfactory: All of the triode tubes are 12AT7, and all of the diodes are 6AL5. The high bias terminal ("— —") is 30 volts negative with respect to ground, and the low bias terminal ("—") is 7 volts negative with respect to ground. The terminal 112 is 40 volts positive, the terminal "+" is 105 volts positive, and the terminal "++" is 250 volts positive. The cathode resistors 104, 138, 238 and 238a are 5,600 ohms. The resistors 110, 114, 139, 239, 242, 239a and 242a are 100,000 ohms. The condensers 116, 152, 154, 240, and 240a and 260a are 50 micro-micro-farads. The condenser 118 is 200 micro-micro-farads, the resistor 122 is 4,700 ohms, and the resistor 156 is 22,000 ohms. The resistor 150 is .5 megohm. The resistors 124, 176, 178, 176a and 178a are 100,000 ohms. The condensers 127, 164, 174, 164a and 174a are 25 micro-micro-farads. The condenser 130 is 450 micro-micro-farads, and the condensers 170 and 170a are 500 micro-micro-farads. Resistors 132 and 142 are 1 megohm. Condenser 140 is .1 micro-farad. The resistor 408 is 20,000 ohms, condenser 406 .001 micro-farad, and condenser 404 is .002 micro-farad. Condenser 146 is 1 micro-farad, and resistor 144 is 15,000 ohms. Resistors 252 and 252a are 68,000 ohms, resistors 254 and 254a are 33,000 ohms and resistors 256 and 256a are 330,000 ohms. The meters 64 and 66 are milliampere meters.

There is described above the general concept and teaching of the present invention. In accordance with the patent laws there is further illustrated in block form a particular embodiment of the invention. For additional understanding of the invention there is presented and described above a specific circuit illustrating one manner of construction of the circuits illustrated in block form. It will be understood that the particular embodiment herein selected in accordance with the law for illustration of the invention should not be considered as limiting the scope of the invention in any way. The scope of the inventive novelty shall be determined only from the appended claims.

What is claimed is:

1. A decade scaler circuit comprising: a source of groups of ten equally spaced identical pulses, the interval between groups being long compared to the duration of each group; means for shaping incoming pulses to be counted to a form substantially identical with that of said identical pulses; a condenser; a series-shunt diode circuit impressing the pulses from both said source and said shaping means upon the condenser to charge the condenser in discrete steps; a one-shot multivibrator having the condenser connected across the input and adapted to be triggered and to discharge said condenser upon the charging of said condenser by ten pulses and to produce an output pulse substantially identical with said other pulses upon said triggering; a vacuum-tube voltmeter connected across the condenser to measure the average voltage thereon; a second condenser; a second series-shunt diode circuit impressing nine of each group of ten pulses from said source and the pulses from said multivibrator upon the second condenser to charge the second condenser in discrete steps; a second one-shot multivibrator, having the second condenser connected across the input and adapted to be triggered and to discharge said second condenser upon the charging of said second condenser by ten pulses; and a second vacuum-tube voltmeter connected across the second condenser to measure the voltage thereon; whereby the first and second vacuum tube voltmeters indicate in units and tens respectively the total number of incoming pulses.

2. A decade scaler circuit comprising: a source of groups of ten identical pulses, the interval between groups being long compared to the duration of each group; means for shaping incoming pulses to be counted to a form substantially identical with that of said identical pulses; a condenser; means for impressing the pulses from both said source and said shaping means upon the condenser to charge the condenser in discrete steps; trigger means having the condenser connected across the input and adapted to be triggered and to discharge said condenser upon the charging of said condenser by ten pulses and to produce an output pulse substantially identical with said other pulses upon said triggering; voltage indicating means connected across the condenser to measure the average voltage thereon; a second condenser; means for impressing nine of each group of ten pulses from said source and the pulses from said trigger means upon the second condenser to charge the second condenser in discrete steps; a second trigger means having the second condenser connected across the input and adapted to be triggered and to discharge said second condenser upon the charging of said second condenser by ten pulses; and a second voltage indicating means connected across the second condenser to measure the voltage thereon; whereby the first and second voltage indicating means indicate in units and tens respectively the total number of incoming pulses.

3. A scaler circuit comprising: a source of groups of a predetermined number of identical pulses, the interval between groups being long compared to the duration of each group; a condenser; means for impressing both the pulses to be counted and pulses from said source upon the condenser to charge the condenser in discrete steps; a trigger means having the condenser connected across the input and adapted to be triggered and to discharge said condenser upon the charging of said condenser by the predetermined number of pulses and to produce an output pulse upon said triggering; means to measure the average voltage of the condenser; a second condenser; means for impressing all but one of each group of pulses from said source and the pulses from said trigger means upon the second condenser to charge the second condenser in discrete steps; trigger means having the second condenser connected across the input and adapted to be triggered and to discharge said second condenser upon the charging of said second condenser by said predetermined number of pulses; and means to measure the average voltage of the second condenser whereby the first and second voltage measuring means indicate in units and multiples of the predetermined number respectively the total number of incoming pulses.

4. A decade scaler circuit comprising: a source of groups of ten identical pulses, the interval between groups being long compared to the duration of each group; a condenser; means for impressing the pulses to be counted and the pulses from said source upon the condenser to charge the condenser in discrete steps; means to discharge said condenser upon the charging of said condenser by ten pulses and to produce an output pulse upon such discharge; a second condenser; means for impressing nine of each group of ten pulses from said source and the pulses from said discharge means upon the second condenser to charge the second condenser in discrete steps; and means to discharge said second condenser upon the charging of said second condenser by ten pulses.

5. A pulse counting circuit comprising: a source of groups of a fixed predetermined number of pulses, the interval between groups being long compared to the duration of each group; a condenser; means impressing both the pulses to be counted and the pulses from said source upon the condenser to alter the charge of the condenser from an original state of charge in discrete steps; means to restore the original state of charge of said condenser only upon the altering of the charge of said condenser by a number of pulses equal to the predetermined number of pulses; and means to measure the average voltage on the condenser.

6. A pulse-counting circuit comprising a condenser, means responsive to each input pulse to be counted to place a charge upon the condenser, means independent of the input pulses to be counted to periodically discharge the condenser and recharge it to a value substantially equal to the voltage prior to discharge at intervals separated by equal time gaps, and means for measuring the average value of the voltage across the condenser.

7. In a pulse-counting circuit, in combination, a condenser, means responsive to each input pulse to place a charge upon the condenser, means independent of the input pulses to be counted to discharge the condenser and recharge it to a value substantially equal to the voltage prior to discharge at intervals separated by equal time gaps, and a direct-voltage-responsive device coupled to the condenser and responsive to the average value of voltage thereon.

8. A pulse-counting circuit comprising an oscillator producing a periodic signal, signal producing means responsive to the oscillator to produce a signal of oscillator frequency, means responsive to the occurrence of an input pulse to change the phase of the signal-producing means signal with respect to the oscillator signal, means responsive to the phase difference between the oscillator signal and the signal-producing means signal to produce a direct voltage corresponding in magnitude to the amount of the phase difference, and meter means responsive to the direct voltage so produced.

9. A pulse-counting and scaling circuit comprising an oscillator producing a periodic signal, signal producing means responsive to the oscillator to produce a signal of oscillator frequency, means responsive to the occurrence of each input pulse up to a predetermined number to change the phase of the signal-producing means signal with respect to the oscillator signal, means responsive to occurrence of each last input pulse of the predetermined number to restore the initial phase relation of said signals, means responsive to the phase difference between the oscillator and the signal-producing means signal to produce a direct voltage corresponding in magnitude to the amount of the phase difference, and means responsive to the direct voltage so produced.

10. Apparatus for scaling and counting pulses comprising means for generating a periodic voltage, means responsive to the occurrence of each input pulse up to a predetermined number to alter a steady-state characteristic of the periodic voltage, means responsive to the occurrence of the input pulse of the predetermined number to return the characteristic to its original value, means for generating a second periodic voltage, means responsive to the return of the characteristic of the first periodic voltage to alter a steady-state characteristic of the second periodic voltage, means to generate direct voltages responsive in magnitude to respective conditions of said characteristics, and means to produce indications of said direct voltages.

11. The apparatus of claim 10 wherein the predetermined number is 10.

12. In apparatus for scaling and counting pulses, in combination, means for generating a periodic voltage, means responsive to the occurrence of each input pulse up to a predetermined number to alter a steady-state characteristic of the periodic voltage, means responsive to the occurrence of the input pulse of the predetermined number to return the characteristic to its original condition, means to generate a direct voltage responsive in magnitude to the condition of said characteristics, and means to produce an indication of said direct voltage.

13. In apparatus for counting pulses, in combination, means for generating a periodic voltage, means responsive to the occurrence of each input pulse to alter a steady-state characteristic of the periodic voltage, means to generate a direct voltage responsive in magnitude to the condition of said characteristic, and means to produce an indication of said direct voltage.

14. Apparatus for counting pulses comprising: a plurality of condensers each having an original state of charge; means for periodically applying to a first of said condensers groups of ten equal charge-altering pulses and to the others of said condensers groups of nine equal charge-altering pulses, the interval between the groups being long compared to the duration of each group; means for applying to said first condenser a charge-altering pulse equal in charge to each of said grouped pulses when each pulse to be counted occurs; means for restoring the original charge of each of said condensers each time it attains a voltage corresponding to the state of charge imparted to it by ten charge-altering pulses; means for coupling the condensers in succession, including means for applying to each condenser succeeding the first condenser a charge-altering pulse equal in charge to each of said grouped pulses each time the last preceding condenser is restored to its original charge; and means for measuring the average value of the voltage across each condenser, such measurements thereby constituting a decimal-system count of the total number of input pulses to be counted.

15. Apparatus for counting pulses comprising: a plurality of condensers each having an original state of charge; means coupled to said condensers for periodically applying thereto groups of a predetermined number of equal charge-altering pulses, the interval between the groups being longer than the interval between individual pulses of the groups; means coupled to a first condenser of said plurality and responsive to the pulses to be counted for applying thereto a charge-altering pulse equal in charge to each of said grouped pulses when each pulse to be counted occurs; means coupled to each of said condensers and responsive to the voltage thereon for restoring the original charge of each of said condensers each time its charge is altered by said predetermined number of charge-altering pulses; means for coupling the condensers in succession including means for applying to each successive condenser succeeding the first condenser a charge-altering pulse equal in charge to each of said grouped pulses each time the last preceding condenser receives said predetermined number of pulses in addition to said groups of pulses; and means coupled to each condenser for measuring the average value of the voltage thereof, such measurements thereby giving a count of the total number of input pulses to be counted.

16. Apparatus for counting pulses comprising: a condenser having an original state of charge; means coupled to the condenser for periodically applying thereto groups of a predetermined number of equal charge-altering pulses, the interval between the groups being longer than the interval between individual pulses of the groups; means coupled to the condenser and responsive to the pulses to be counted for applying to the condenser a charge-altering pulse equal in charge to each of said grouped pulses when each pulse to be counted occurs; means for restoring the original charge of said condenser each time its charge is altered by the predetermined number of charge-altering pulses; and a direct-voltage-responsive device coupled to the condenser and responsive to the average value of the voltage across the condenser.

17. In apparatus for counting pulses comprising means for charging a condenser by a fixed amount for each occurrence of an input pulse, and means for measuring the voltage across the condenser, the improvement wherein there are provided means operable over equal time intervals and independent of the occurrence of input pulses coupled to the condenser for discharging and re-charging it to a value dependent upon its previous voltage value, said intervals being separated by equal time gaps, and means for measuring the average value of the voltage across the condenser.

18. The improvement of claim 17 wherein the charging and discharging means comprises means for discharging the condenser each time it reaches a predetermined voltage, and means for periodically inserting a group of pulses each equal in charge to said fixed amount, the total charge provided by each such group of pulses being equal to the amount of charge required to charge the condenser from a discharged condition to said predetermined voltage.

19. A pulse-counting circuit comprising a condenser, means responsive to the appearance of a given voltage across the condenser to discharge the condenser, means responsive to each input pulse to apply charge to the condenser, a charging source independent of input pulses coupled to the condenser to periodically apply thereto over periods of time separated by equal time gaps an amount of charge corresponding to said given voltage, and a direct-voltage-responsive device coupled to the condenser and responsive to the average value of the voltage across the condenser.

20. In a pulse-counting circuit, in combination: a condenser having an original state of charge; means coupled to the condenser and responsive to each input pulse to be counted to alter the charge of the condenser in one direction; means independent of input pulses to be counted and operating in cycles separated by equal time gaps to restore the original state of charge of the condenser and then restore the charge to a value substantially equal to its value at the commencement of the cycle; and a voltage-responsive device coupled to the condenser and responsive to the value of its charge during the time gaps.

21. Apparatus for scaling and counting pulses comprising means for inducing a plurality of periodically fluctuating voltages, each having an initial average value, means for varying the average value of the first fluctuating voltage in a discrete step upon each first through ninth pulse to be counted, means for returning said average value to its initial value upon the occurrence of each tenth pulse to be counted, means for varying the average value of each succeeding fluctuating voltage in cascade in a discrete step in response only to the return of the immediately preceding fluctuating voltage to its initial average value, means for returning each of said succeeding voltages to its initial value upon the occurrence of ten returns of the immediately preceding voltage to its respective initial value, and means responsive to the average value of at least one of said fluctuating voltages.

22. Apparatus for scaling and counting pulses comprising means for producing a plurality of periodically fluctuating voltages, each having an initial average value, means for varying the average value of the first fluctuating voltage in a discrete step upon each occurrence of a pulse to be counted, up to a predetermined number, means for returning said average value to its initial value upon the occurrence of the last pulse of the predetermined number, means for varying the average value of each succeeding fluctuating voltage in cascade in a discrete step in response only to the return of the immediately preceding fluctuating voltage to its initial value, means for returning each of said succeeding voltages to its initial average value upon the occurrence of the predetermined number of returns of the immediately preceding voltage to its respective initial average value, and means responsive to the average value of at least one of said fluctuating voltages.

23. Apparatus for scaling and counting pulses comprising means for inducing a plurality of periodically fluctuating voltages, means for varying a steady-state characteristic of the first fluctuating voltage in a discrete step upon each first through ninth pulse to be counted, means for returning said first fluctuating voltage to its original condition upon the occurrence of each tenth pulse to be counted, means for varying a steady-state characteristic of each succeeding fluctuating voltage in cascade in a discrete step in response only to the return of the immediately preceding fluctuating voltage to its original condition, means for returning each of said succeeding voltages to its original condition upon the occurrence of ten returns of the immediately preceding voltage to its respective original condition, means for producing direct voltages responsive to respective conditions of said characteristics of said fluctuating voltages, and means for producing indications of each of said direct voltages.

24. Apparatus for scaling and counting pulses comprising means for inducing a plurality of periodically fluctuating voltages, means for varying a steady-state characteristic of the first fluctuating voltage in a discrete step upon each occurrence of a pulse to be counted up to a predetermined number, means for returning said first fluctuating voltage to its original condition upon the occurrence of the last pulse of the predetermined number, means for varying a steady-state characteristic of each succeeding fluctuating voltage in cascade in a discrete step in response only to the return of the immediately preceding fluctuating voltage to its original condition, means for returning each of said succeeding voltages to its original condition upon the occurrence of a predetermined number of returns of the immediately preceding voltage to its respective original condition, means for producing direct voltages responsive to respective conditions of said characteristic of said fluctuating voltages, and means for producing indications of each of said direct voltages.

References Cited in the file of this patent

UNITED STATES PATENTS

| Number | Name | Date |
| --- | --- | --- |
| 2,374,248 | Tuttle | Apr. 24, 1945 |
| 2,414,107 | Kenyon | Jan. 14, 1947 |
| 2,487,191 | Smith | Nov. 8, 1949 |
| 2,510,485 | Vossberg | June 6, 1950 |

OTHER REFERENCES

Design and Operation of an Improved Counting Rate Meter, Kip et al., Review of Scientific Instruments, Sept. 1946, pp. 323–333.